(12) United States Patent
Rose

(10) Patent No.: US 12,339,115 B2
(45) Date of Patent: Jun. 24, 2025

(54) DOWNLIGHT LASER JIG

(71) Applicant: Rosendin Electric, Inc., San Jose, CA (US)

(72) Inventor: Steven Lee Rose, Lakewood, CA (US)

(73) Assignee: Rosendin Electric, Inc., San Jose, CA (US)

( * ) Notice: Subject to any disclaimer, the term of this patent is extended or adjusted under 35 U.S.C. 154(b) by 443 days.

(21) Appl. No.: 17/688,640

(22) Filed: Mar. 7, 2022

(65) Prior Publication Data
US 2022/0290982 A1    Sep. 15, 2022

Related U.S. Application Data

(60) Provisional application No. 63/159,353, filed on Mar. 10, 2021.

(51) Int. Cl.
*G01B 11/27* (2006.01)

(52) U.S. Cl.
CPC .................... *G01B 11/27* (2013.01)

(58) Field of Classification Search
CPC .................................................... G01B 11/27
USPC ... 33/227, 228, 286, 290, 291, 292, DIG. 21
See application file for complete search history.

(56) References Cited

U.S. PATENT DOCUMENTS

| | | | | |
|---|---|---|---|---|
| 4,799,586 A * | 1/1989 | Kutzli | ................... | B23Q 7/005 269/69 |
| 5,144,487 A * | 9/1992 | Hersey | ............... | G02B 27/1073 356/138 |
| 5,257,775 A | 11/1993 | Burns | | |
| 5,505,000 A * | 4/1996 | Cooke | .................. | G01B 5/0002 33/286 |
| 6,430,823 B1 * | 8/2002 | Seki | ..................... | G01C 15/004 33/286 |
| 6,532,676 B2 * | 3/2003 | Cunningham | ....... | G01C 15/008 33/286 |
| 7,073,268 B1 * | 7/2006 | Etter | ..................... | B27B 27/02 33/640 |

(Continued)

FOREIGN PATENT DOCUMENTS

| | | |
|---|---|---|
| CN | 108637974 A | 10/2018 |
| CN | 110202355 A | 9/2019 |

OTHER PUBLICATIONS

International Searching Authority, The International Search Report and the Written Opinion of the International Searching Authority, or the Declaration, Jun. 15, 2022.

*Primary Examiner* — George B Bennett
(74) *Attorney, Agent, or Firm* — Rutan and Tucker, LLP

(57) ABSTRACT

A method, system, and apparatus for light fixture installation using a downlight laser jig. The downlight laser jig can have a housing structure to house a laser. The housing structure can have two or more walls, and a floor for a laser to sit in the housing structure. The housing structure can have one or more handles to assist in a lifting of the downlight laser jig. The housing structure can have at least one of 1) two or more magnets, 2) two or more spring clips, and 3) any combination of both to hold the downlight laser jig in place and support a weight of the downlight laser jig and the laser during an installation process for a series of downlight fixtures. The downlight laser jig and the laser combine to assist in aligning and installing the series of downlights fixtures in a ceiling.

20 Claims, 15 Drawing Sheets

(56) References Cited

U.S. PATENT DOCUMENTS

| | | | |
|---|---|---|---|
| 7,124,513 B2 * | 10/2006 | Chen | H01S 5/02 33/286 |
| 7,213,342 B2 * | 5/2007 | Khubani | G01C 15/008 33/290 |
| 7,454,840 B2 * | 11/2008 | Delfini | G01C 15/002 33/484 |
| 8,037,615 B2 * | 10/2011 | Glaser | G01B 11/272 33/529 |
| 8,373,527 B2 * | 2/2013 | Fullerton | H01F 7/0273 335/306 |
| 8,713,811 B2 * | 5/2014 | Carrell | B25H 7/005 33/529 |
| 8,769,837 B2 * | 7/2014 | Min | A61G 5/10 33/286 |
| 8,813,379 B2 * | 8/2014 | Zimmermann | G01B 11/26 33/291 |
| 8,991,062 B2 * | 3/2015 | Atkinson | G01B 11/26 33/286 |
| 8,994,935 B2 * | 3/2015 | Kinney | G01B 9/00 356/138 |
| 9,057,607 B2 * | 6/2015 | Travis | G01C 15/004 |
| 9,518,823 B2 * | 12/2016 | Hill | G01C 15/004 |
| 9,950,400 B2 * | 4/2018 | Johnson | F16D 1/0864 |
| 10,690,497 B2 * | 6/2020 | Nagashima | G01C 15/08 |
| 11,027,453 B2 * | 6/2021 | Ma | B23D 47/02 |
| 11,125,552 B2 * | 9/2021 | Wang | G01B 21/24 |
| 11,781,865 B2 * | 10/2023 | Gould | B23Q 17/2233 33/286 |
| 11,986,888 B2 * | 5/2024 | Halvorsen | B25J 11/005 |
| 2004/0163265 A1 * | 8/2004 | Helms | G01S 7/4026 33/286 |
| 2004/0172836 A1 * | 9/2004 | Ng | G01C 15/10 33/286 |
| 2005/0022399 A1 * | 2/2005 | Wheeler | G01C 15/002 33/286 |
| 2005/0117153 A1 * | 6/2005 | Kishi | G01C 15/004 356/399 |
| 2005/0278966 A1 * | 12/2005 | Liu | G01C 15/004 33/286 |
| 2007/0011894 A1 * | 1/2007 | Chen | G01C 15/004 33/286 |
| 2007/0130785 A1 * | 6/2007 | Bublitz | G01C 15/002 33/290 |
| 2012/0042527 A1 * | 2/2012 | Olsen | G01C 15/12 33/286 |
| 2013/0167386 A1 * | 7/2013 | Peng | G01C 15/004 33/290 |
| 2022/0290981 A1 * | 9/2022 | Schulterbrandt | G03B 21/2033 |
| 2023/0194261 A1 * | 6/2023 | White | G01C 15/004 33/290 |
| 2023/0324173 A1 * | 10/2023 | Sergyeyenko | F16M 11/128 33/290 |

* cited by examiner

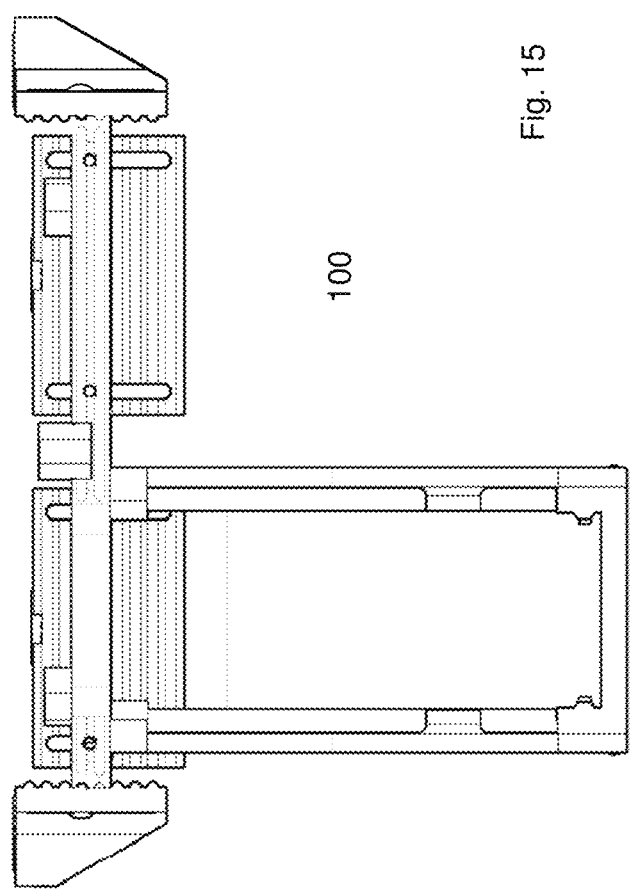

DOWNLIGHT LASER JIG

RELATED APPLICATION

This application claims priority under 35 USC 119 to U.S. provisional patent application Ser. 63/159,353, titled "DOWN-LIGHT LASER JIG," filed 10 Mar. 2021, which the disclosure of such is incorporated herein by reference in its entirety.

TECHNICAL FIELD

An embodiment of a concept herein relates to techniques and tools in electrical construction and light fixture/luminary installation including downlights.

BACKGROUND

The installing of lights in a building takes a long time and can be very labor intensive.

SUMMARY

Provided herein are various methods, apparatuses, and systems for a downlight laser-jig to assist in installing a series of downlight fixtures.

In an embodiment, a downlight laser-jig that includes a housing structure and one or more handles to assist in a lifting of the downlight laser jig. The housing structure houses a laser. The housing structure has two or more walls, and a floor for a laser to sit in the housing structure. One or more handles to assist in a lifting of the downlight laser jig.

At least one of 1) two or more magnets, 2) two or more spring clips, and 3) any combination of both in order to hold the downlight laser-jig in place and support a weight of the downlight laser-jig and the laser during an installation process for a series of downlight fixtures. The downlight laser-jig and the laser combine to assist in aligning and installing the series of downlight fixtures in a ceiling.

These and many more embodiments are discussed.

DRAWINGS

Various example embodiments can be more completely understood in consideration of the following detailed description in connection with the accompanying drawings, in which:

FIG. 15 illustrates a side down view of an embodiment of the downlight laser jig with the ribs of an adjustable height magnet guides.

Figure 1:
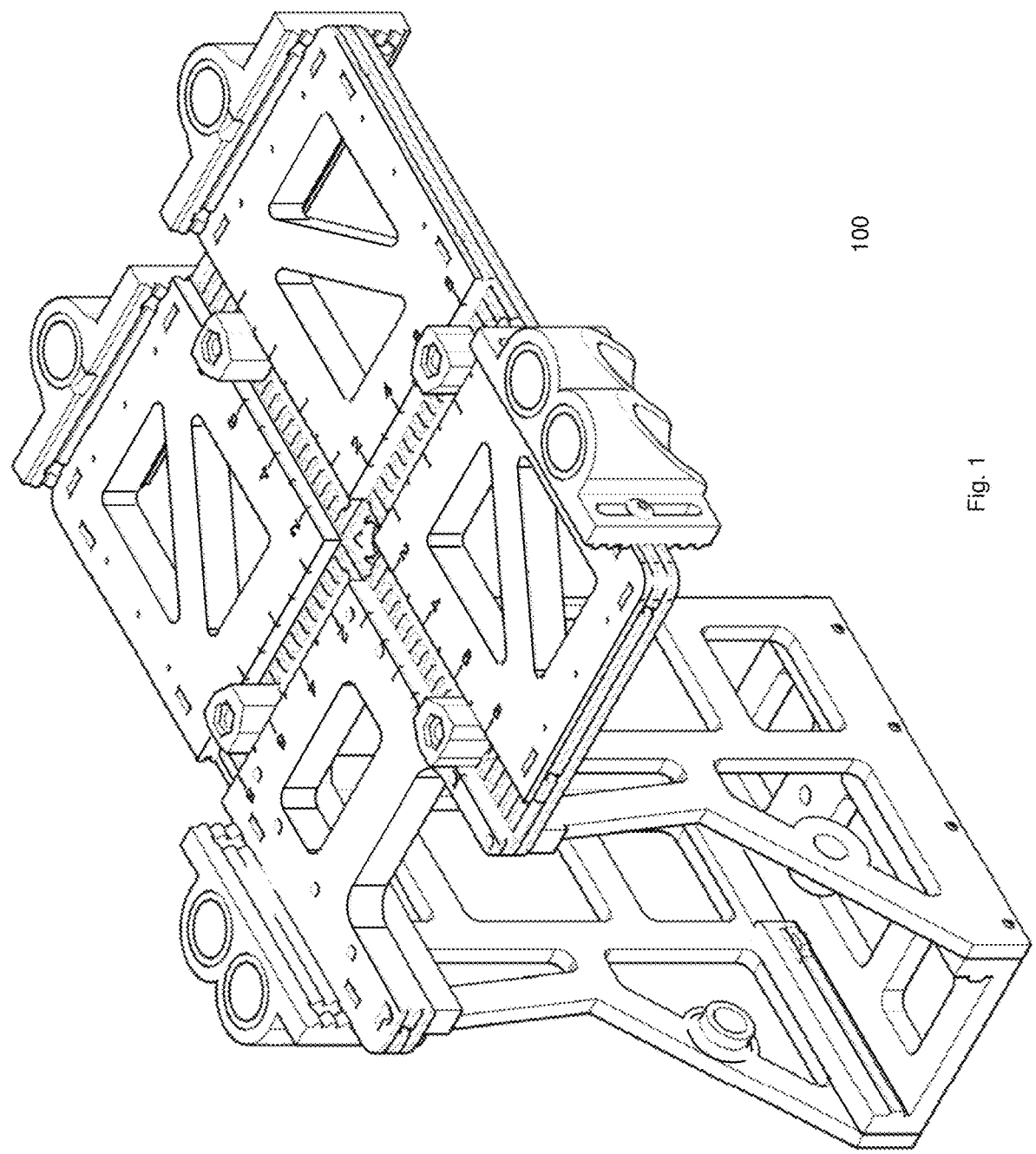
FIG. 1 illustrates an isometric view of an embodiment of the downlight laser jig that includes a housing structure and at least one of two or more magnets two or more spring clips and any combination of both hold downlight laser jig in place and support the weight of a laser jig and laser during an installation process.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DISCUSSION

In the following description, numerous specific details are set forth, such as examples of specific downlights, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as a first downlight, may be made. However, the specific numeric reference should not be interpreted as a literal sequential order but rather interpreted that the first downlight is different than a second downlight. Thus, the specific details set forth are merely exemplary. The specific details may be varied from and still be contemplated to be within the spirit and scope of the present invention.

Figure 2:
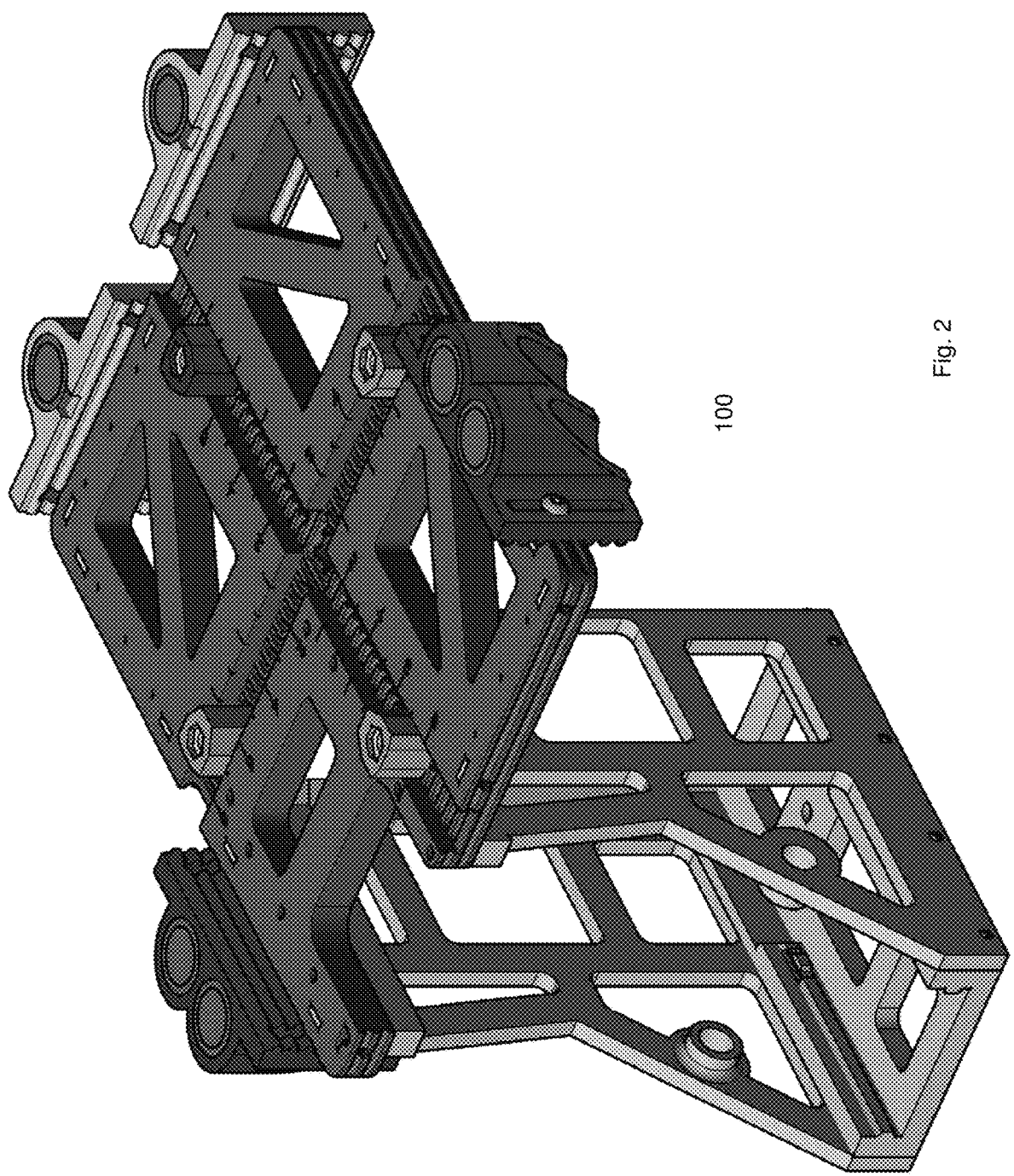
FIG. 2 illustrates an isometric view of an embodiment of the downlight laser jig that includes a housing structure with shading to better illustrate the three dimensionality (3D) aspects of this example of the downlight laser jig with the housing.

FIG. 1 illustrates an isometric view of an embodiment of the downlight laser jig 100 that includes a housing structure and at least one of two or more magnets two or more spring clips and any combination of both hold downlight laser jig 100 in place and support the weight of a laser jig and laser during an installation process. FIG. 2 illustrates an isometric view of an embodiment of the downlight laser jig 100 that includes a housing structure with shading to better illustrate the three dimensionality (3D) aspects of this example of the downlight laser jig 100 with the housing.

An example form factor for the downlight laser jig 100 for the installed laser can be a rectangular housing structure including its rectangular top mounting plate and magnets to support a weight of the downlight laser jig 100 and the laser during an installation process for a series of downlight fixtures. (See e.g. FIG. 13) Another example form factor for the downlight laser jig 100 with the laser installed can be a top mounting plate with a housing for a plumb bob laser. The top mounting plate has magnets and spring clips attached to one side of the top mounting plate. (See e.g. FIG. 4)

Figure 3:
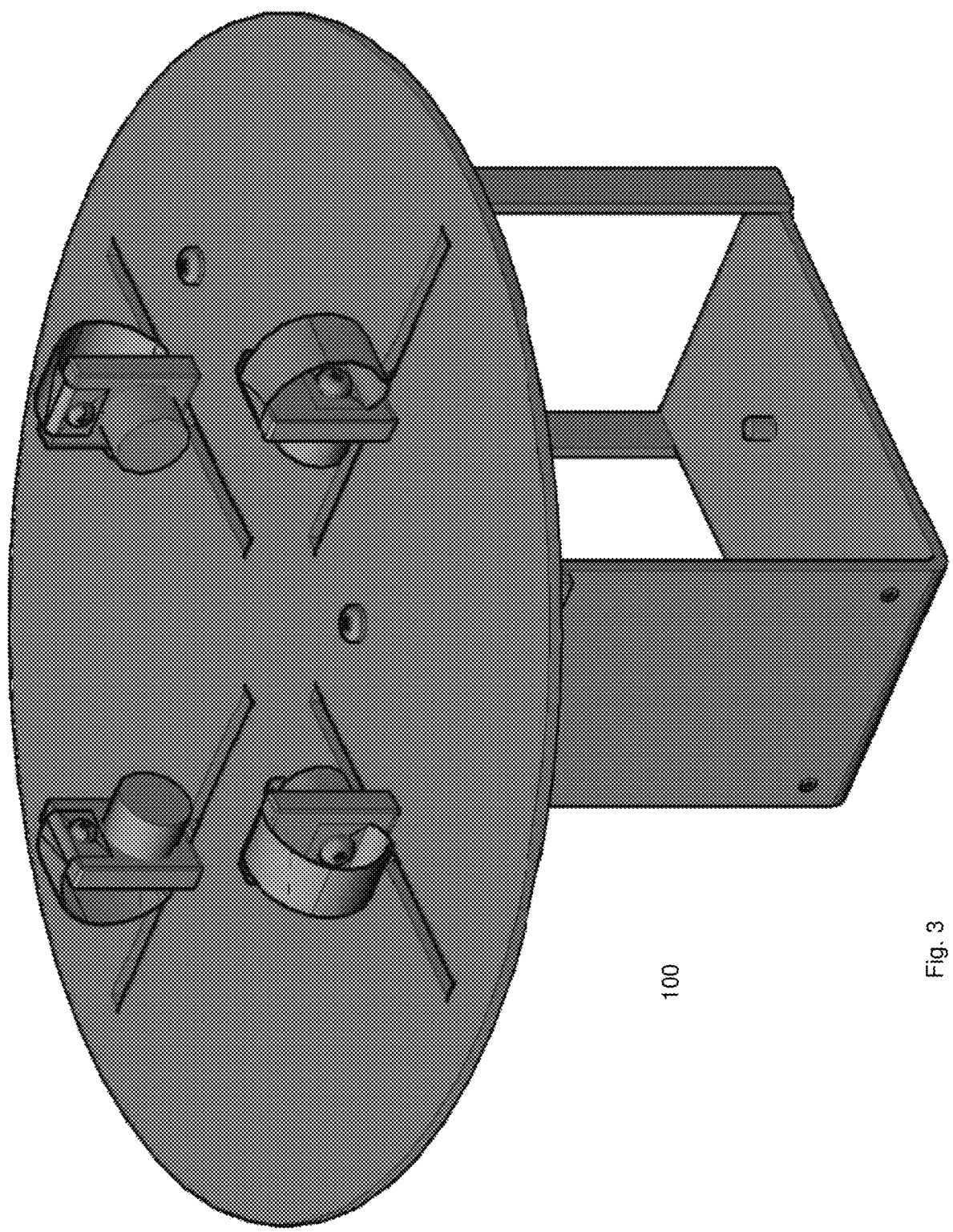
FIG. 3 illustrates an isometric view of an embodiment of the downlight laser jig with a round top mounting plate coupling mechanically to the two or more walls.
Figure 4:
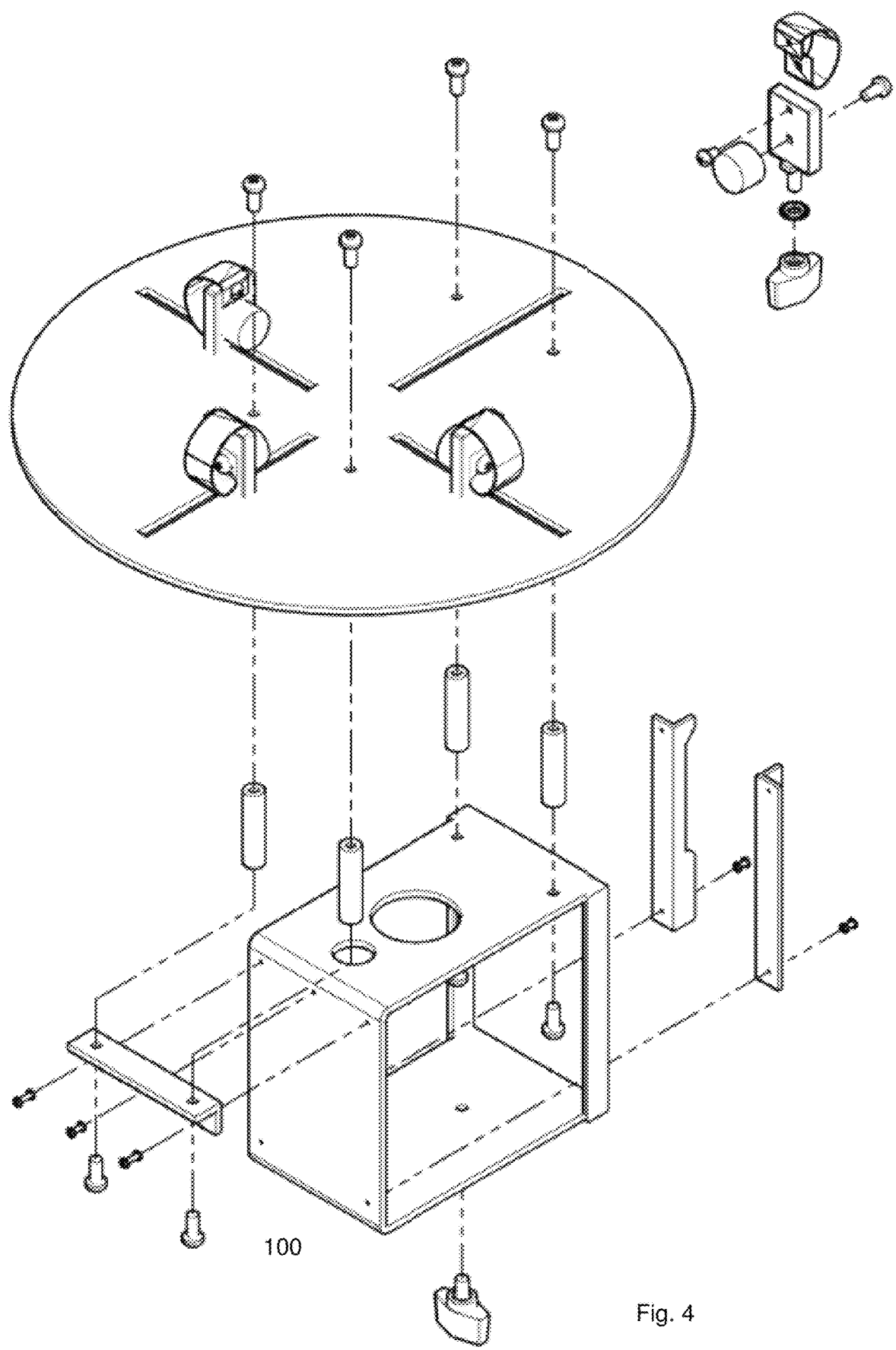
FIG. 4 illustrates an exploded view an isometric view of an example embodiment of the downlight laser jig and a top mounting plate with a round shape and multiple stanchions to couple to the walls of the housing.
Figure 5:
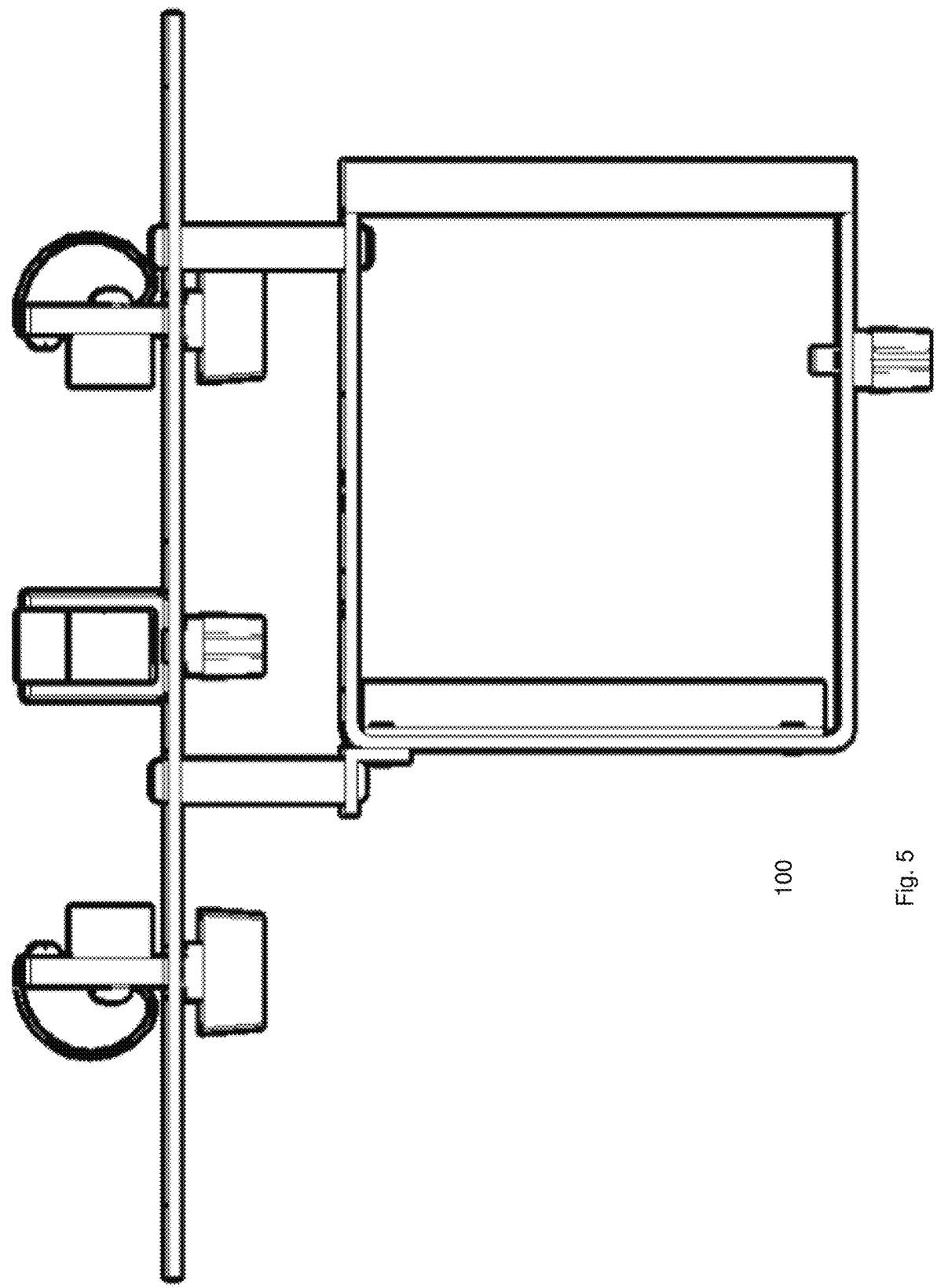
FIG. 5 illustrates a side view of an embodiment of the downlight laser jig with a round top mounting plate of the housing and a floor for a laser to sit in the housing structure.

The housing structure has two or more walls (e.g. a right side laser mount stand and a left side laser mount stand), and a floor (e.g. a laser mount base) with one or more openings for a laser to shine through the floor of the housing structure (e.g. a laser mount base), and a top mounting plate that couples mechanically to the two or more walls. The two or more walls also couple mechanically to the floor with lips. For example, FIG. 1 shows a downlight laser jig 100 and its housing with a top mounting plate coupling mechanically to the two or more walls, and the two or more walls coupling mechanically to the floor with lips. FIG. 3 illustrates an isometric view of an embodiment of the downlight laser jig 100 with a round top mounting plate coupling mechanically to the two or more walls. FIG. 4 illustrates an exploded view an isometric view of the downlight laser jig 100 and a top mounting plate with a round shape and multiple stanchions to couple to the walls of the housing. FIG. 5 illustrates a side view of an embodiment of the downlight laser jig 100 with a round top mounting plate of the housing and a floor for a laser to sit in the housing structure. The floor has one or more lips in order to easily place the laser into the housing structure and lift the laser out of the downlight laser jig 100. The housing structure to house a laser, such as a plumb bob laser, a plane laser, a planar laser, etc., to assist in aligning and actually installing for an installation process for the series of downlights and their corresponding downlight fixture locations, such as a series of can lights. The downlight laser jig 100 has the housing structure to hold and store the laser as well as one or more clamping mechanisms, screws clamps, spring clamps, etc., to position the laser into its desired location within the downlight laser jig 100 and then secure the laser in place within the housing. The laser will be positioned to shine its laser for alignment for the downlight with respect to the other downlights (and potentially leveling purposes). Again, the laser may be a plane laser (e.g. a 3-plane laser), a planar laser, a plumb bob laser, any combination of these. Note, the plane laser can be both a complete level as well as an alignment laser, which can quickly arrange and define room layout.

FIG. 3 illustrates an isometric view of an embodiment of the downlight laser jig 100 with a round top mounting plate and two or more magnets and two or more spring clips to hold the downlight laser jig 100 in place and support the weight of a laser jig and laser during an installation process. The downlight laser jig 100 may also have/use spring clips to hold the jig in place inside of a can of a downlight as well as support the weight of the downlight laser jig 100 and installed laser. The spring clips and magnets may form a combined structure. Rare earth magnets, such as neodymium, can be on one side and on the other side, flipped 180 degrees, are the spring clips that snap into the aluminum housing, and either the magnets or the spring clips can hold the downlight laser jig 100 in place.

In an aluminum can housing of a downlight, the spring clips can be used to support the weight of the jig and laser when inserted into the can of the downlight. The spring clips can include a spring, such as a clamp shaped spring, a rectangular base, a cylindrical pad, and other similar components. Thus, the downlight laser jig 100 can be constructed to have two or more spring clips to support the weight of the downlight laser jig 100 and installed laser as well as hold the downlight laser jig 100 in place inside of a can of a first downlight fixture.

The downlight laser jig 100 can have a plane laser mounted/nested in the housing of the downlight laser jig 100 (e.g. lower holding bracket). A laser is placed in a housing structure of the downlight laser jig 100, which is constructed to be mounted under a light fixture being installed (or at least a planned location in a ceiling of where a light fixture will be installed) in order to at least keep electricians from descending from approximately a ceiling elevation down to a ground level and then having to get on their hands and knees to set a laser on the ground (pointing up to the ceiling) and then repeat this process each time the worker moves to another light fixture location. FIG. 1 shows the lower holding bracket/housing structure of the downlight laser jig 100 in which a laser would sit in that lower holding bracket/housing structure of the downlight laser jig 100. A laser nestles into the lower holding bracket/housing structure of the downlight laser jig 100. The downlight laser jig 100 is constructed to mount to a bottom of a sheet metal plate that has a downlight fixture, which is being installed; as opposed to, the laser being set on the ground and pointed up to the light fixture in the ceiling. The downlight laser jig 100 can coordinate with a series of markings on a floor to keep a row of lights (e.g., and corresponding light fixtures) aligned down a centerline and not veer askew to the left or right of the centerline. The downlight laser jig 100 can be used to install can light fixtures/luminaires and is not limited to only specifically downlights. The light fixture can come installed on a sheet metal plate or subsequently be installed on a sheet metal plate. A downlight is generally a recessed lighting fixture in a ceiling.

Figure 6:
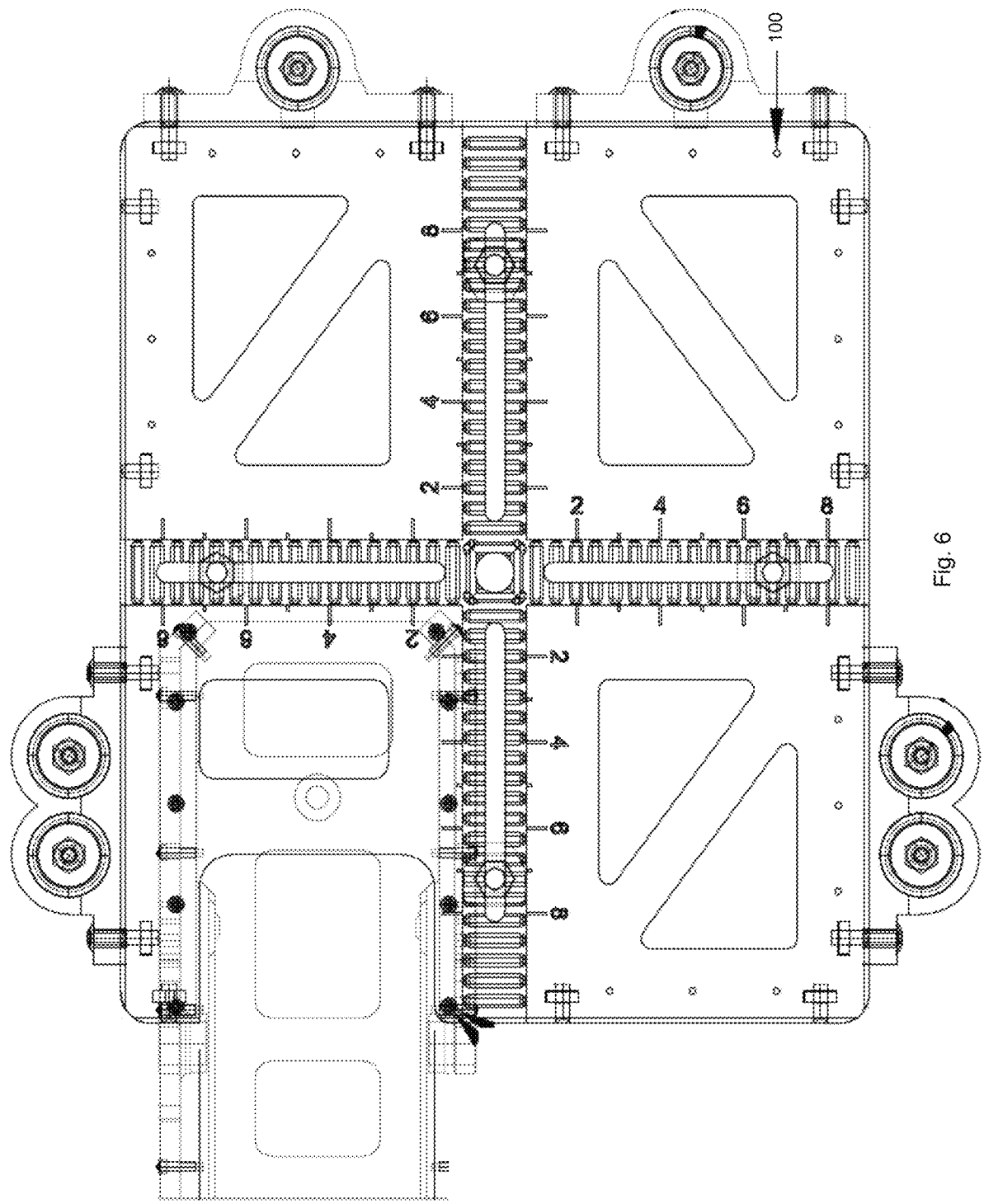
FIG. 6 illustrates a top down view of an embodiment of the downlight laser jig that includes a housing structure and at least two or more magnets to both hold downlight laser jig in place and support the weight of a laser jig and laser during an installation process.

FIG. 6 illustrates a top down view of an embodiment of the downlight laser jig 100 that includes a housing structure and at least two or more magnets to both hold downlight laser jig 100 in place and support the weight of a laser jig and laser during an installation process. A downlight laser jig 100 can have two or more magnets, such as two to three magnets per side, to hold the laser jig in place and support the weight of the laser jig during an installation process for a series of downlight fixtures.

FIG. 2 illustrates a front view of a downlight laser jig 100 and the ribs formed in the mounting plate coupling to the ribs in the magnetic guides. The ribs formed in the mounting plate couple to ribs in the magnetic guides. Each magnetic guide also has one or more slots to raise the magnetic guide to a height needed for that job to couple the jig to the recessed can of the downlight. The downlight laser jig 100 is configured to have multiple adjustable height magnet guides, each adjustable height magnet guide containing one or more magnets on at least two sides of the housing of the downlight laser jig 100 used to hold and support the weight of the laser and the downlight laser jig 100 when suspended from the ceiling around a downlight fixture location for a downlight. In the example shown, two adjustable height magnet guides have a pair of magnets and two adjustable height magnet guides have a single magnet. The adjustable height magnet guides mate to the top mounting plate. Once the adjustable height/elevation is set for each of the adjustable height magnet guides, then a securing device such as a screw, bolt, and/or wingnut, can lock down through the slot into a receiving hole in the body of the top mounting plate in order to secure the adjustable height magnet guide at a desired height/elevation. For the example above, six magnets with adjustable height magnet guides each can be locked into its own adjustable elevation with the combination of screws and rib to rib interlocking.

Again, FIGS. 1 and 2 show the magnets having an adjustable height in order to hold and secure the downlight laser jig 100 to the bottom of the sheet metal plate. The magnets are adjusted in FIGS. 1 and 2 to about midway in their adjustable height secured in place through a set of bolts. The magnets could be adjusted to their maximum height by the grooves/ribs in the casing for the adjustable height magnet guide being raised all the way to match the ribs at the bottom of the top mounting plate and then secured in place through a set of bolts. FIG. 15 illustrates a side down view of an embodiment of the downlight laser jig the ribs formed in the mounting plate coupling to with the ribs of an adjustable height magnet guides. Again, the magnets in a casing of the adjustable height magnet guide hold and secure the downlight laser jig 100 to the bottom of the sheet metal plate. The magnets when engaged/raised to the correct height now stabilize and hold/secure the jig to bottom of the sheet metal plate/and or metal stud.

As discussed, the multiple magnets used per side of the downlight laser jig 100 have a magnetic strength capacity to hold and support the weight of the laser and the downlight laser jig 100 when suspended from the ceiling around a light fixture location for the downlight. The downlight laser jig 100 can be mounted via magnets to a plate that has a light fixture mounted to the plate and/or to a stud that will have a light fixture connected to that stud. FIG. 6 illustrates a top down view of the downlight laser jig and an example of six magnets. Each magnet has between a five and twenty-five pound weight rating to be able to hold and support the weight of the laser and downlight laser jig 100 when suspended from the ceiling. Thus, when there are six total magnets, each with an example 20 pound weight rating, the magnets should be able to support up to 120 pounds hanging from the ceiling without danger of the downlight laser jig 100 falling to the ground. The total magnetic strength needs to be balanced that each time the worker finishes the installation at one light fixture, then the worker needs to use the magnetic bracket 150 with the T-handle to break the magnetic bond between these 6 magnets and the ferrous metal/metal sheet in the ceiling that the magnets lock into in order to move to the location of the next downlight to be installed. Typically, dozens of downlights need to be installed per room, and there are a lot of rooms per building. Thus, creating magnets of the downlight laser jig 100 with too strong of a weight capability such as double the actual weight of the downlight laser jig 100 with the laser installed will soon become physically taxing for the worker repeatedly installing downlights for no real benefit. Also related, the bracket material for the center handle and T-handles can be made of a material composition, such as a hardened plastic, a rigid steel, etc. in order to be rigid and durable. The stronger the overall magnetic bond to the ceiling, then the more force must be transmitted through the T-handles to break that magnetic bond; and thus, a hardened plastic or a rigid steel with a strength to transmit that force without deforming or breaking. The center handle and T-handles couple to the housing structure to act as handles to assist in a lifting of the downlight laser jig 100. As discussed, the center handle is generally used to lift the magnetic bracket 150 and coupled downlight laser jig 100 to the ceiling. (See for example FIG. 7)

Figure 7:
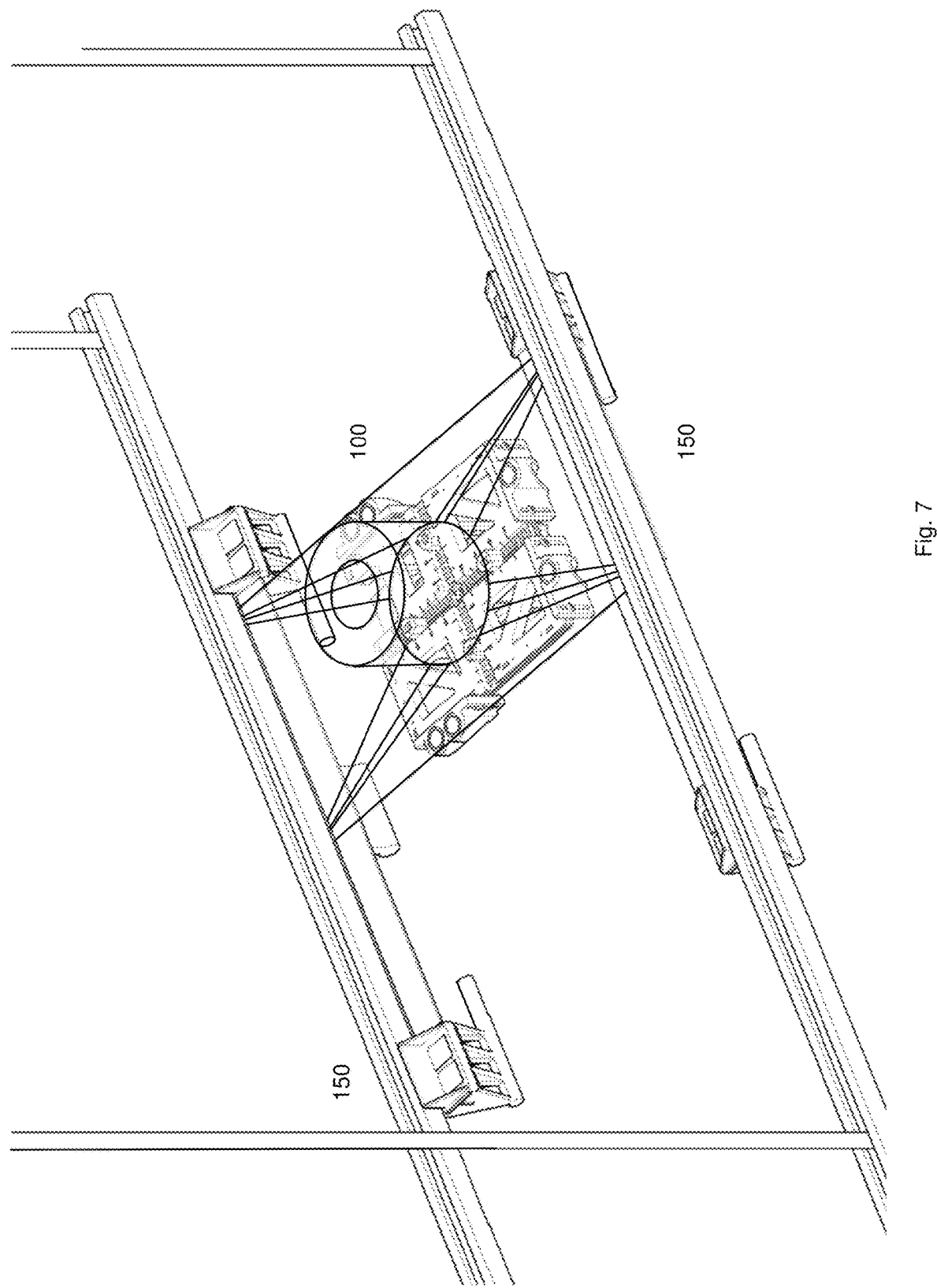
FIG. 7 illustrates a view of an example embodiment of the downlight laser-jig in place during an installation of an example lighting fixture in an example ceiling.
Figure 8:
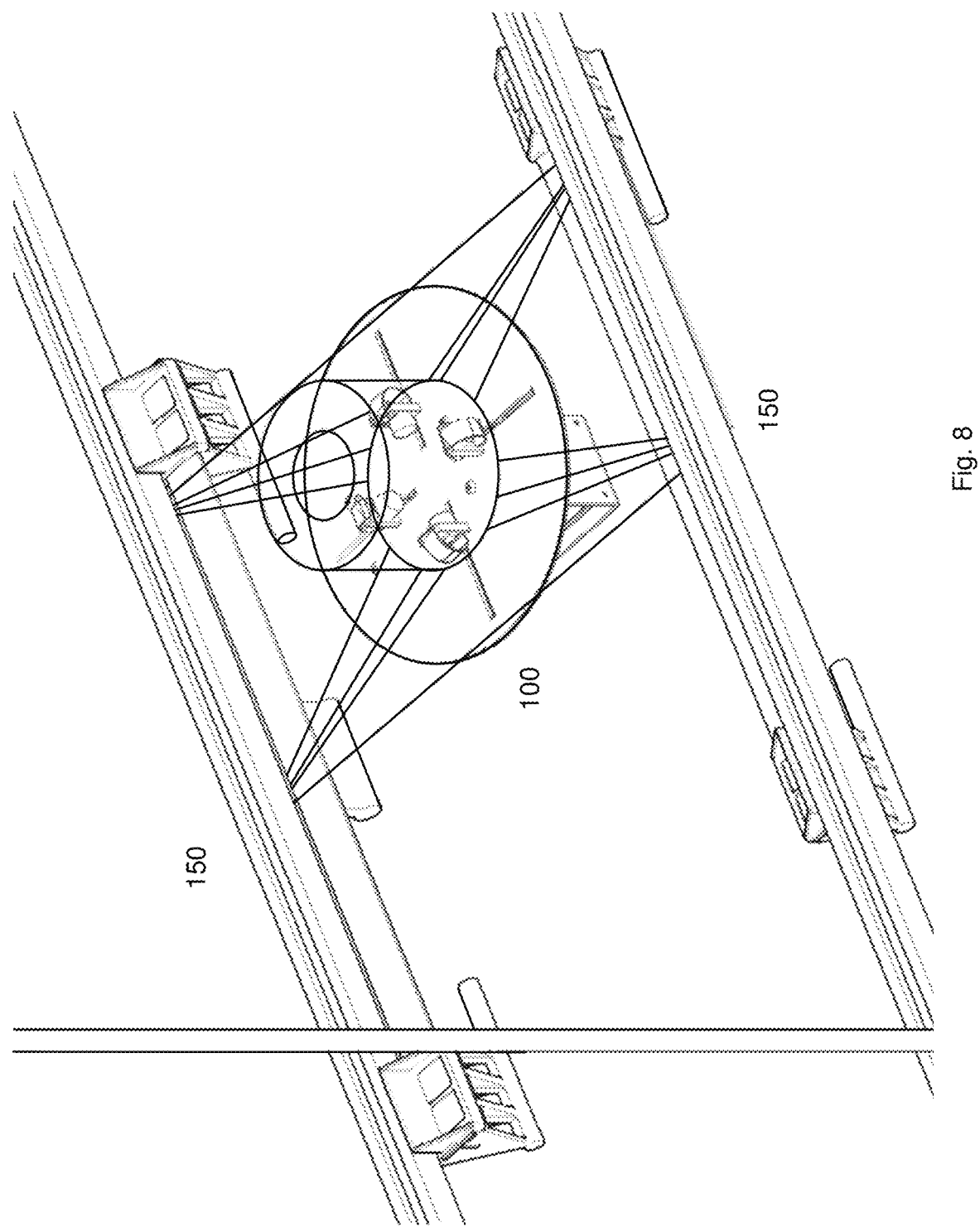
FIG. 8 illustrates a view of an example embodiment of the downlight laser-jig in place during an installation of an example lighting fixture in an example ceiling.

FIG. 7 illustrates a view of an example embodiment of the downlight laser jig 100 in place during an installation of an example lighting fixture in an example ceiling. FIG. 8 illustrates a view of an example embodiment of the downlight laser jig 100 with a round mounting plate in place during an installation of an example lighting fixture in an example ceiling. Both FIGS. 7 and 8, show the downlight laser jig 100 with his housing structure positioned below a circular can of a downlight and coupled to the magnetic brackets 150 with handles. Each T bracket is capable of breaking the magnetic bond between the ceiling that the magnets of the housing structure that support the weight of the download laser jig and its installed laser. Note, FIG. 8 illustrates an embodiment with a round top mounting plate and spring clips that are positioned and clipped into a recessed can of a downlight. The spring clips clipped into the can of the downlight support the weight of the downlight laser jig 100 and install laser. FIG. 8 also shows two T brackets with handles coupled to the downlight laser jig 100.

Referring to FIGS. 7 and 8, the adjustable height magnets mount the rest of the jig to the bottom of the sheet metal plate. This view is from the ceiling looking down to the ground looking towards the jig and its structure and the can of the downlight. The magnets that are designed to hold the downlight jig to the bottom sheet metal plate are adjustable in height in order to adapt to different height parameters for different types of lighting fixtures and different physical distances at this particular job site (e.g., ceiling/drop ceiling/drywall). The adjustable height magnet guides have ridges/ribs on their casing. The ridges on the jig structure and magnet casing allow a bolt and/or screw to secure the magnet casing to the jig structure as well as to move a height of each magnetic to up and down via the grooves. Each different job site may have a different ceiling, such as two layers of drywall and different lighting fixture manufacturers have different designs so having multiple adjustable height magnetics allow the jig to adapt to most fixture installation scenarios. Thus, the adjustable height magnets hold the downlight laser jig 100 to the bottom of the sheet metal plate.

Referring to FIGS. 1 and 2, the downlight laser jig 100 can have four adjustable height magnet guides each with multiple magnetic cores aligned laterally (in more of a combined rectangular profile versus a single large oval profile) to better line up with rectangular studs and/or rails making up a typical ceiling.

Note, the magnets are located offset of the desired area for the light fixture so that the magnets can attach to the bottom of the plate and not be in the way. This leaves wide open the actual area where the electrician has to put a drill and install the light fixture. Thus, a reason it's offset and not in a straight line is to be able to adapt to the bottom of the studs and be open for the electrician to run their screws into the bottom through the sheet metal plate up into the fixture. The downlight laser-jig 100 guides the electrician where he or she will put the sheet metal screws through.

Referring back to FIGS. 7 and 8, as discussed, the installation of downlight fixtures in the ceiling can occur with the downlight laser jig 100. A benefit of the downlight laser jig 100 can be the worker gets to stay on the scissor lift and/or scaffolding up in the air and drive/move to the next downlight installation location rather than having to get on off the lift after each downlight installation.

Figure 9:
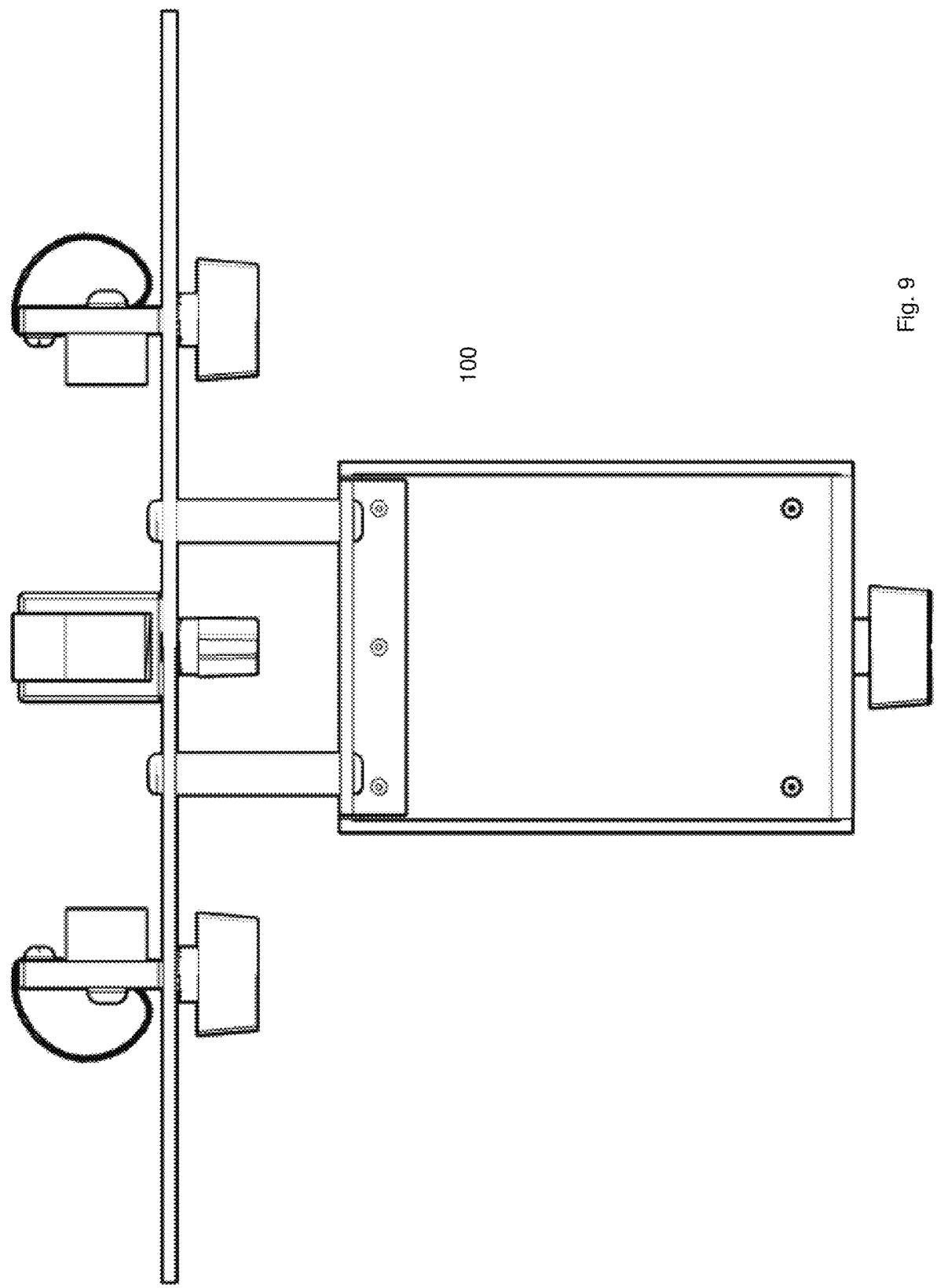
FIG. 9 illustrates a front view of an embodiment of the downlight laser jig with a round top mounting plate of the housing and one or more adjustable clamping mechanisms to position the laser into a planned location within the downlight laser-jig and then secure the laser in place within the housing.

The downlight laser jig 100 has a laser mounted and/or contained within its housing structure. The laser housed in the downlight laser jig 100 shoots a laser beam down to the ground to a layout point. FIG. 9 illustrates a front view of an embodiment of the downlight laser jig 100 with a round top mounting plate of the housing and one or more adjustable clamping mechanisms to position the laser into a planned location within the downlight laser jig 100 and then secure the laser in place within the housing. Typically, a series of markings will be made on the ground to align rows of light fixtures to be installed in the ceiling. First, procedurally, the electrician does the layout of markings on the ground. The electrician puts, for example, pieces of tape on the ground in an 'X' pattern so they can layout a center mark on the tape. The set of 'X' marks on the ground can use a number of methods to make rows of 'X's aligned, for example, centerline with respect to each other. The set of 'X' marks on the ground correspond to the downlight fixture locations. The ground markings can be set for other precise patterns of light fixtures (e.g., not all aligned in a row(s) of light fixtures but maybe in a 'W' pattern, "H" pattern, etc.) are also possible. The point is the markers on the ground showing planned locations of the downlighting fixtures for that particular room are marked and indicated on the ground. These markings on the ground can easily be checked again and again to ensure they are in the precise location with respect to each other where the ideal placing of the light fixtures should be.

The traditional practice of locating the fixture location in the ceiling is to set a laser on the ground at a marked location and then to point the laser up to the planned ceiling location of where the fixture in the ceiling should be installed. The electrician gets on their hands and knees to set the laser on the ground. Note, when the laser on the floor is aimed at the ceiling, inaccuracies can and will occur for exactly where to install the light fixture so that this light fixture will be aligned centerline with respect to all of the lighting fixtures in the row.

In contrast, the downlight laser jig 100 is aimed down from the ceiling at the location of the downlight about to be installed, down to the ground. When using the downlight laser jig 100 a planar laser can shine two transverse lines forming an 'X' on the ground by the laser beam can reliably and repeatedly align a light fixture being installed with respect to other lighting fixtures in a ceiling. Note, a precise location even with micro-adjustments can be made to the location of the fixture can reliably occur with the jig downlight laser. The electrician is already at the ceiling elevation with the downlight laser jig 100 with its magnets and/or spring clips holding itself in place at approximately the right location; and then, the electrician can make small adjustments to the jig until it assists in establishing a near perfect location for the downlight fixture to be centerline with other fixtures in that row/pattern of light fixtures.

Figure 10:
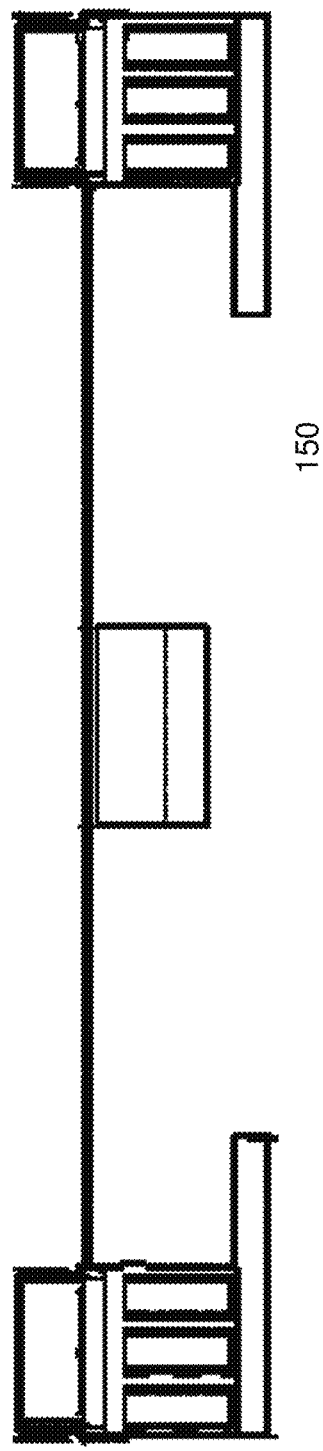
FIG. 10 illustrates a front view of an example embodiment of shows the magnetic bracket with the center handle coupled to each T-shaped bracket with its magnetics.
Figure 11:
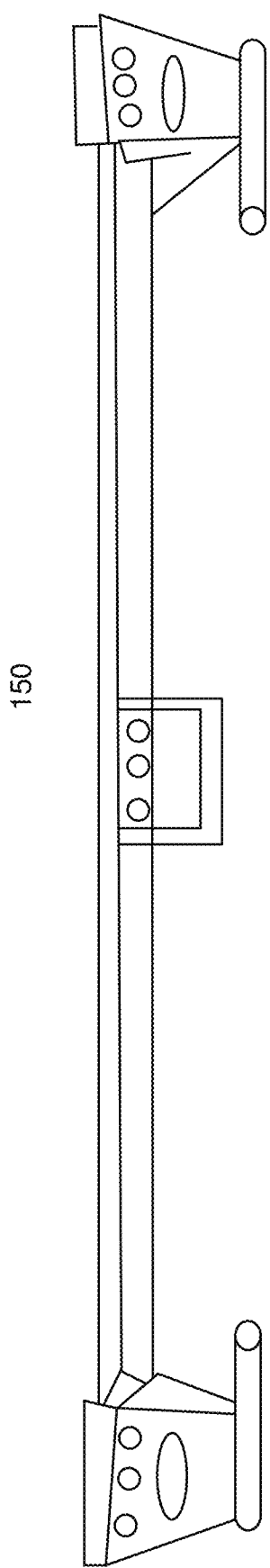
FIG. 11 illustrates a sketch an embodiment of the magnetic bracket with a center handle that couples to the T-shaped bracket with its magnetics.
Figure 12:
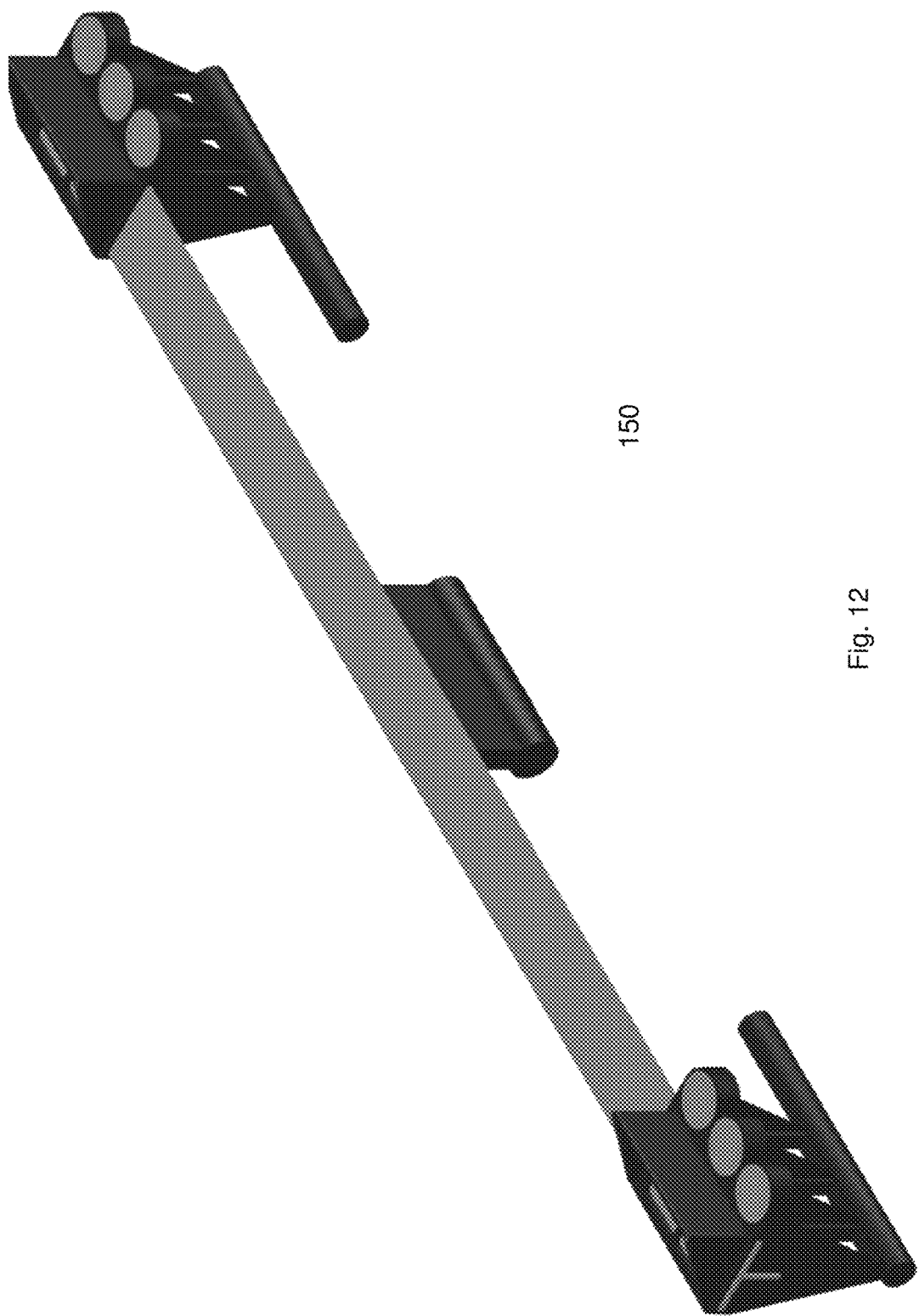
FIG. 12 illustrates an isometric view of an example embodiment of a magnetic bracket with an aluminum handle coupling to an aluminum T-shaped bracket with its magnetics with shading to better illustrate its 3D aspects.

FIGS. 7 and 8 illustrate a top down view of an embodiment of the downlight laser jig 100 that includes a housing structure and at least two or more magnets to both hold downlight laser jig 100 in place and support the weight of a laser jig and laser during an installation process into a recessed can of the downlight. The electrician can place the downlight laser jig 100 onto the bottom of the sheet metal plate that the downlight fixture itself has been mounted to. The electrician then takes the assembly to an elevation of approximately the ceiling height using a ladder or a scissor lift. There are two or more magnetic brackets and/or spring clips that hold the plate with the fixture mounted to it to the underside of metal studs in the ceiling. The downlight laser jig 100 can have two or more magnets, two or more spring clips, and any combination of both. The electrician can use a center handle to hold up the magnetic bracket 150 when placing the downlight laser jig 100 onto the bottom of the metal stud. The center handle gets placed approximately over the center mark on the ground. FIG. 10 illustrates a front view of an example embodiment of shows the magnetic bracket 150 and the center handle coupled to each T-shaped bracket with its magnetics. FIG. 11 illustrates a sketch of an embodiment of the magnetic bracket 150 with a center handle that couples to the T-shaped bracket with its magnetics. FIG. 12 illustrates an isometric view of an example embodiment of a magnetic bracket 150 with an aluminum handle coupling to an aluminum T-shaped bracket with its magnetics with shading to better illustrate its 3D aspects. The electrician lifts the jig into position with the handles on T-shaped bracket. The electrician can also use a center handle for holding up and positioning the T-shaped bracket with its magnetics when placing the downlight jig onto the bottom of the metal stud/rail. The electrician then places one of the magnetic plate brackets onto the bottom of one stud, and then places the sheet metal bracket over that plate, and the electrician then places the next magnetic bracket 150 into place.

In an embodiment, the handles can couple to an aluminum T-shaped bracket that goes from one side to the other side. Note, the T-shaped brackets can also be made of hardened plastic and/or a ridged steel to ensure repeated torque on the handles to break the magnetic bond between the sheet metal the downlight fixates is installed on and the magnets of the downlight laser jig 100. The reason for the center handle (as opposed to merely the two handles located at the end of the T shape) is because it is easier to hold and handle the sheet metal with the light fixture from the middle as opposed to holding it from one end.

FIGS. 1, 2, and 6 show the adjustable tabs of the jig that can be adjusted in size in order to match the dimensions of the current fixture's opening's size being installed. Note, the magnetic bracket 150 for holding the plate between the bracket and the metal stud is designed to have enough space (⅛") to be able to adjust the plate side-to-side in four directions. The downlight laser jig 100 has this expansion mechanism, such as the adjustable tabs, in order to adapt its size to match the dimensions of the opening of the current downlight fixture being installed.

Figure 14:
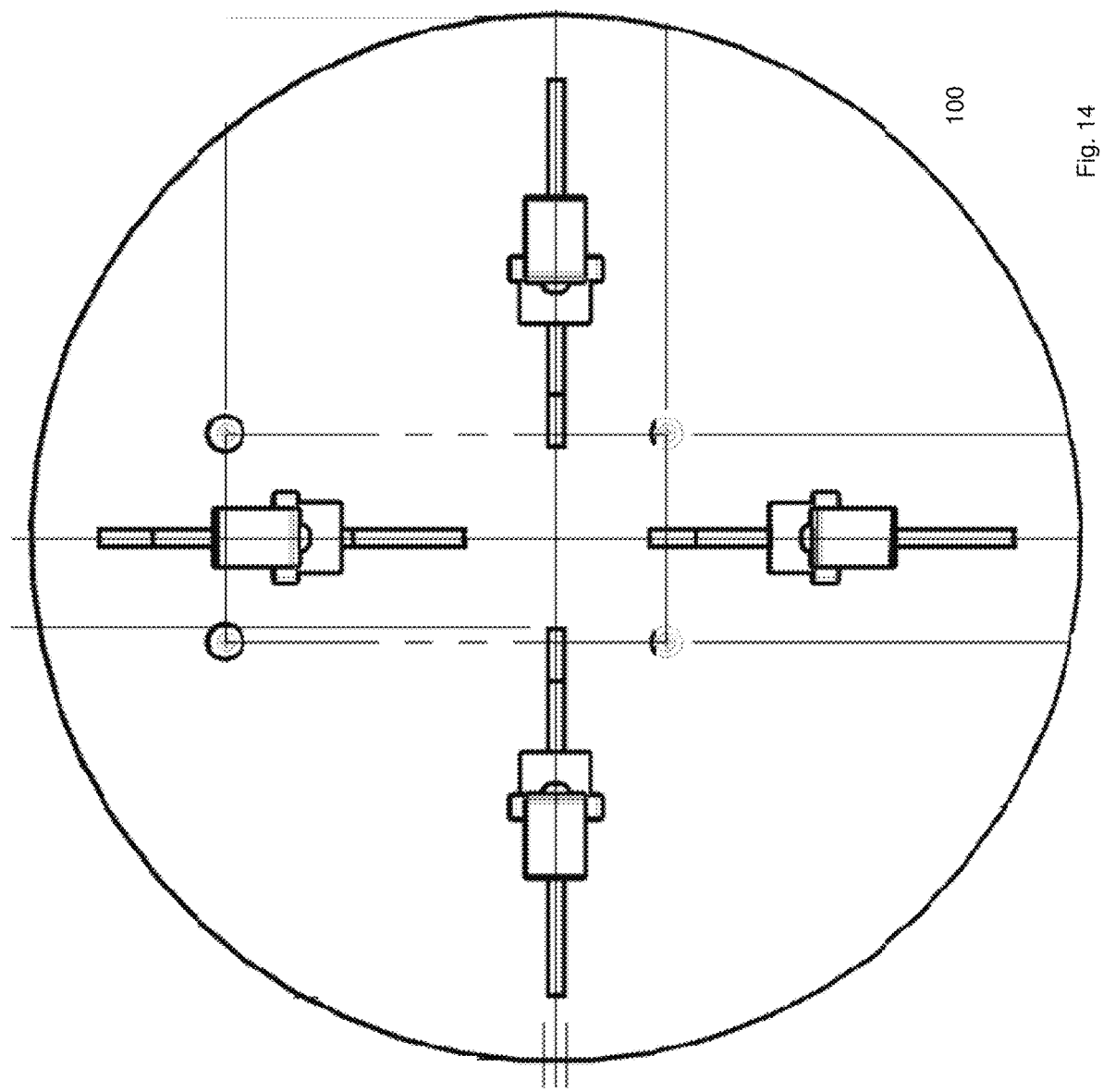
FIG. 14 illustrates a top down view of an embodiment of the downlight laser jig with a round top mounting plate of the housing and an expansion mechanism with slots in four directions.

FIGS. 4 and 14 also show the adjustable tabs of the expansion mechanism in the downlight laser-jig 100 with a round top mounting plate that can be adjusted in size in order to match the current fixture opening size being installed.

The adjustable tabs are adjustable to size the jig to match a light fixture's opening. Thus, for example, the diameter of the cup and/or width of a rectangular fixture are adjusted to match the outside diameter of the fixture. As shown in FIG. 6, this diameter and/or width can go from two inches up to eight inches in diameter and/or width, and any point in between. The adjustment ridges for the tabs can be set at ⅛" increments and/or 1/16" increments. Those adjustable tabs will keep the light fixture as installed from getting cockeyed.

Figure 13:
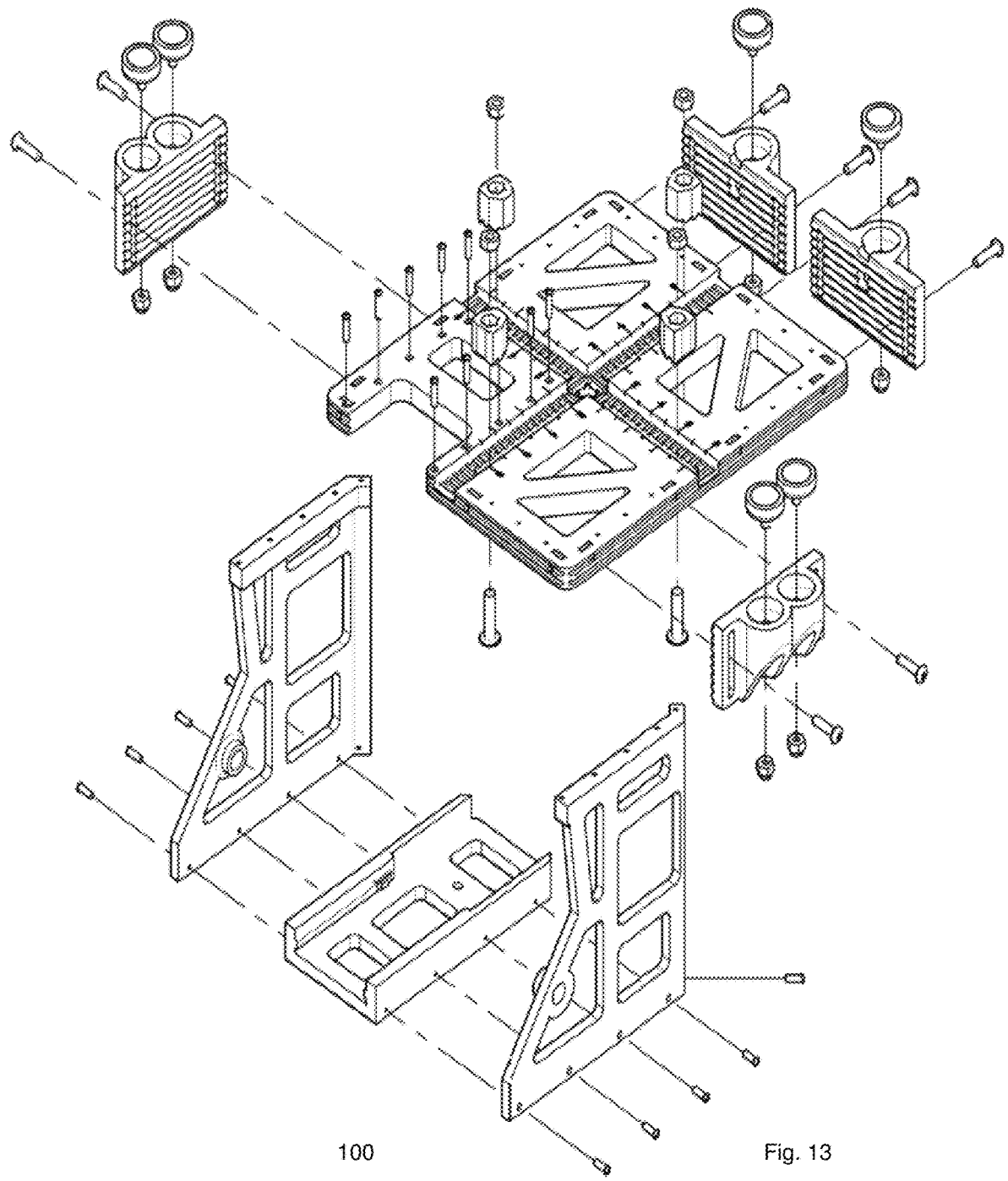
FIG. 13 illustrates an exploded view an isometric view of an example embodiment of the downlight laser jig and a top mounting plate that has an expansion mechanism constructed to adapt its size to match a can of a downlight fixture being installed with cap nuts to match the size a downlight fixture.

FIG. 13 illustrates an exploded view an isometric view of the downlight laser jig 100 and a top mounting plate that has an expansion mechanism constructed to adapt its size to match a can of a downlight fixture being installed with cap nuts to match the size a first downlight fixture. The top mounting plate has an expansion mechanism constructed to adapt its size to match a downlight fixture being installed. The top mounting plate in the expansion mechanism generally has measurement markings, for example, ¼" markings, and slots in all four directions. FIG. 6 illustrates a top down view of an embodiment of the downlight laser jig 100 with a top mounting plate of the housing and an expansion mechanism with slots in four directions. The slots in all four directions allow a worker to move nuts to the size to match an opening size of a downlight fixture and then screw them down in place. Each slot can have its own bolt, lock nut washer, nut, and knob/cap nut fabricated to contain the nut within the cap nut. The knob/cap nut with the nut within the cap nut gives the user a lot of surface area to grip with their fingers and easily torque the nut sitting within the knob/cap nut on one side of the top mounting plate into its bolt and lock washer on the other side of the expansion mechanism in the top mounting plate. Thus, the expansion mechanism can have knobs and bolts to secure and torque the downlight laser jig 100 into position when the expansion mechanism has been expanded and then secured to match the size and shape of the downlight fixture being installed.

FIG. 14 illustrates a top down view of an embodiment of the downlight laser jig 100 with a round top mounting plate of the housing and an expansion mechanism with slots in four directions. In another example, the expansion mechanism can have ridges set at ½ inch increments in order to adjust the plate side-to-side in four directions, in ½ inch increments to match the size and shape of the can opening of the downlight fixture being installed. In this example, the downlight laser jig 100 has an expansion mechanism to allow the spring clips and/or magnets to expand out to match a dimension and shape of a recessed can of a downlight, for example, a 2 to 10 inch diameter of an oval. Note, even within a same room a size and a shape of one downlight fixture can be different than the size and the shape of another downlight fixture. Certainly, different rooms and on different job sites the can of the downlight can vary in its size and shape.

As shown in FIGS. 7 and 8, with the magnets engaged and holding the jig to bottom of the sheet metal plate, the electrician is freed up. At this point, the electrician has gone hands-free and does not need to support a weight of the jig to try to keep it in place. Now, the electrician can center the fixture over the mark using the laser via making slight adjustments to get the laser beam of the down-laser jig; and thus, the fixture in its precise location to keep the centerline with the other light fixtures in the ceiling. Also, that same downlight laser jig 100 will be used for the next light fixture and the next fixture making the reliability of the positioning of a row of fixtures extremely reliable and repeatable. When the laser hits the mark on the ground, the electrician can now screw the sheet metal plate that has the installed light fixture to the bottom of the metal studs. When the electrician is done with that fixture, they take the downlight laser jig 100 off of the sheet metal plate, remove the magnetic brackets 150, and move to the next spot to install the next fixture. As discussed, the downlight laser jig 100 keeps the electrician at roughly ceiling elevation during the installation process, which greatly reduces the need to go up and down with a scissor lift. Roughly ceiling elevation can be, for example, within an arm's reach of the ceiling. The downlight laser jig 100 greatly reduces the time to install downlights as opposed to current practices.

The magnets are powerful enough to hold and secure the downlight laser jig 100 steadily in position and not worry about small bumps and/or jolts repositioning the downlight laser jig 100 off of the sheet metal plate. However, as shown in FIG. 12, the jig has two ruggedly built outer handles on the T-shaped bracket to allow the electrician to repeatably remove the powerful magnetics from the sheet metal of the fixture. The electrician can use their body weight when pushing and rotating on the outer handles to break the powerful magnets away from the sheet metal.

As a recap, the downlight laser jig 100 has the ability to hold a laser, such as a plane laser, precisely in place under the light fixture being installed via the adjustable height magnets and to a lesser extent the expansion mechanism adapting the downlight laser jig 100 to match the downlight being installed. Again, an example 'X' marking on the ground as well as an example green laser beam from the jig in an 'X' pattern aligned with the 'X' marking on the ground. The downlight laser jig 100 in conjunction with the magnetic plate brackets allows the electrician to shine the laser down to the mark on the ground. The laser nestled in the downlight laser jig 100 shines its laser through the opening in the bottom of the housing structure onto markings on the floor. The markings on the floor are laid out to form the desired pattern of the downlights to be installed in the ceiling. A proper alignment to keep the fixtures in a row can be an 'X' laser beam from the downlight laser jig 100 laid out at a 45 degree angle with respect to the 'X' mark on the floor. Thus, the fixture is adjusted so that the two 'X's cross to make a 45 degree angle from each other. The electrician can align the jig; and thus, the light fixture in a straight line with respect to other light fixtures in that row by aligning the laser beam with the 'X' on the ground. The plane laser can shine an 'X' pattern laser beam but other patterns are also possible. The laser can be a planar laser but can also be a plumb bob laser that merely shines a point on the ground, such as at a dead center of the mark on the ground.

In an embodiment, the downlight laser jig 100 specifically is designed to allow for its use with light fixtures that are square in design, by the use of the plane laser. The plane laser shines between marks placed on the ground and when cutting through the center of the marks it will keep square edges straight in relation to each other.

The downlight laser jig 100 can use a sheet metal plate to mount the fixture but could also mount to the light fixture by being held to the bottom of the metal plate of the light fixture by the use of the magnets and/or spring clips with, for example, the downlight laser jig 100 with a round top mounting plate.

As discussed, the downlight laser jig 100 allows the installing electrician to install a downlight with greater speed and ease than current industry practices. In addition, the aligning a row of lights can be precise and reliably made along a center align versus individual variability per fixture installation. In general for the downlight fixture in the ceiling to be installed, the electrician needs to be on scaffolding and/or a scissor lift to hold up and put the downlight laser jig 100 in place and install the downlight fixture. After the downlight is installed the electrician when on a scissor lift has no need to lower the lift, get out, move the laser to the next layout mark on the ground, walk back to the lift, get back in, drive to the new location, and then raise themselves up in the air to the point where they can start to install the next downlight. Instead, they stay at elevation, drive to the new location, place the jig onto the bottom of the sheet metal plate, and start the installation process.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The type of cabinets may vary, etc. The invention is to be understood as not limited by the specific embodiments described herein, but only by scope of the appended claims.

The invention claimed is:

1. An apparatus, comprising:
a downlight laser jig that includes
a housing structure configured to house a laser, where the housing structure has two or more walls, and a floor for a laser to sit in the housing structure, one or more handles configured to assist in a lifting of the downlight laser jig, and
at least one of 1) two or more magnets, 2) two or more spring clips, and 3) any combination of both to hold the downlight laser jig in place and support a weight of the downlight laser jig and the laser during an installation process for a series of downlight fixtures, where the downlight laser jig and the laser combine to assist in aligning and installing the series of downlight fixtures in a ceiling.

2. The apparatus of claim 1, where the downlight laser jig has a top mounting plate as part of the housing structure configured to hold and store the laser, where the top mounting plate is constructed to couple mechanically to the two or more walls, where the laser is positioned to shine its laser for alignment of a first downlight fixture with respect to the other downlight fixtures in the series of downlight fixtures to be installed.

3. The apparatus of claim 1, where the laser is selected from a group consisting of one of a plane laser, a plumb bob laser, and a combination of the plumb bob laser and the plane laser.

4. The apparatus of claim 1, where the downlight laser jig is constructed to have the two or more spring clips to support the weight of the downlight laser jig and installed laser as well as hold the downlight laser jig in place inside of a can of a first downlight fixture.

5. The apparatus of claim 1, where the floor is configured to have one or more openings for the laser to shine through the floor of the housing structure, where the downlight laser jig is configured to coordinate with a series of markings on a ground to keep a row of downlight fixtures in the series of downlight fixtures aligned with respect to each other in a planned pattern formed by the series of downlight fixtures.

6. The apparatus of claim 1, where the downlight laser jig is configured to have the two or more magnets, where the downlight laser jig is configured to have multiple adjustable height magnet guides, each adjustable height magnet guide containing one or more magnets in at least two sides of the housing of the downlight laser jig is configured to hold and support the weight of the laser and the downlight laser jig when suspended from the ceiling around a first downlight fixture location for a first downlight.

7. The apparatus of claim 1, where the downlight laser jig is configured to have the two or more magnets, where each magnet has between a five and twenty-five pound weight rating to be able to hold and support the weight of the laser and downlight laser jig when suspended from the ceiling.

8. The apparatus of claim 1, where the downlight laser jig is configured to have two or more T-handles configured to break a magnetic bond between the two or more magnets and a ferrous metal in the ceiling that the magnets lock into in order to support the weight of the downlight laser jig with the laser installed.

9. The apparatus of claim 1, where bracket material for a center handle and one or more T-handles of the downlight laser jig are made of a material composition of one or more selected from a group consisting of a hardened plastic, a rigid steel, and any combination of both in order to be rigid and durable to lift the downlight laser jig and remove the downlight laser jig from the ceiling, and
where the center handle is configured to hold up and balance the weight of the downlight laser jig when placing the downlight laser jig into position to align and install a first downlight fixture.

10. The apparatus of claim 1, where the downlight laser jig has an expansion mechanism in a top mounting plate of the housing with measurement markings and slots in two or more directions, where the expansion mechanism in the top mounting plate is constructed to adapt its size to match a can of a first downlight fixture being installed, where at least one of a size and a shape of the first downlight fixture is different than the size and the shape of the second downlight fixture.

11. A method for downlight laser jig, comprising:
configuring a housing structure to house a laser, where the housing structure has two or more walls, and a floor for a laser to sit in the housing structure,
configuring one or more handles to assist in a lifting of the downlight laser jig, and
configuring at least one of 1) two or more magnets, 2) two or more spring clips, and 3) any combination of both to hold the downlight laser jig in place and support a weight of the downlight laser jig and the laser during an installation process for a series of downlight fixtures, where the downlight laser jig and the laser combine to assist in aligning and installing the series of downlights fixtures in a ceiling.

12. The method of claim 11, further comprising:
configuring the housing structure to hold and store the laser as well as have one or more adjustable clamping mechanisms to position the laser into a planned location within the downlight laser jig and then secure the laser in place within the housing, where the laser is positioned to shine its laser for alignment of a first downlight fixture with respect to the other downlight fixtures in the series of downlight fixtures to be installed.

13. The method of claim 11, where the laser is selected from a group consisting of one of a plane laser, a plumb bob laser, and a combination of the plumb bob laser and the plane laser.

14. The method of claim 11, further comprising:
configuring the downlight laser jig to have the two or more spring clips to support the weight of the downlight laser jig and installed laser as well as hold the downlight laser jig in place inside of a can of a first downlight fixture.

15. The method of claim 11, further comprising:
configuring the floor to have one or more openings for the laser to shine through the floor of the housing structure, and
configuring the downlight laser jig to coordinate with a series of markings on a ground to keep a row of downlight fixtures in the series of downlight fixtures aligned with respect to each other in a planned pattern formed by the series of downlight fixtures.

16. The method of claim 11, further comprising:
configuring the downlight laser jig to have the two or more magnets in at least two sides of the downlight laser jig, and
configuring the downlight laser jig to have multiple adjustable height magnet guides, where each adjustable height magnet guide containing one or more magnets in at least two sides of the housing of the downlight laser jig are used to hold and support the weight of the laser and the downlight laser jig when suspended from the ceiling around a first downlight fixture location for a first downlight.

17. The method of claim 11, further comprising:
configuring the downlight laser jig to have the two or more magnets, where each magnet has between a five and twenty-five pound weight rating to be able to hold and support the weight of the laser and downlight laser jig when suspended from the ceiling.

18. The method of claim 11, further comprising:
configuring the downlight laser jig to have two or more T-handles configured to break a magnetic bond between the two or more magnets and a ferrous metal in the ceiling that the magnets lock into in order to support the weight of the downlight laser jig with the laser installed.

19. The method of claim 11, where bracket material for a center handle and one or more T-handles of the downlight laser jig are made of a material composition of one or more selected from a group consisting of a hardened plastic, a rigid steel, and any combination of both in order to be rigid and durable to lift the downlight laser jig and remove the downlight laser jig from the ceiling, and
configuring the center handle to hold up and balance the weight of the downlight laser jig when placing the downlight laser jig into position to align and install a first downlight fixture.

20. The method of claim 11, further comprising:
configuring the downlight laser jig to have an expansion mechanism in a top mounting plate of the housing with measurement markings and slots in two or more directions, where the expansion mechanism in the top mounting plate is constructed to adapt its size to match a can of a first downlight fixture being installed, where at least one of a size and a shape of the first downlight fixture is different than the size and the shape of the second downlight fixture.

* * * * *